A. SIMONS.
Bee Hive.
No. 81,220.
Patented Aug. 18, 1868.
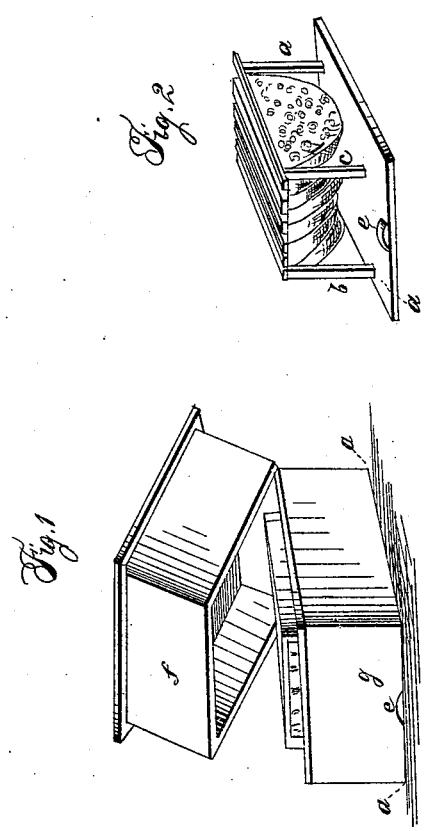
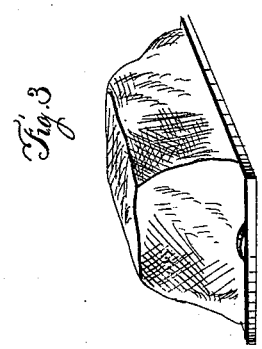

United States Patent Office.

ANDREW SIMONS, OF FAIRFIELD, IOWA.

Letters Patent No. 81,220, dated August 18, 1868.

IMPROVEMENT IN TRELLIS FOR PROPAGATING BEES.

The Schedule referred to in these Letters Patent and making part of the same.

TO ALL WHOM IT MAY CONCERN:

Be it known that I, ANDREW SIMONS, of Fairfield, county of Jefferson, State of Iowa, have invented a Trellis for Propagating Bees and raising honey, and a system of protecting the trellis during winter by means of a covering of cloth, or other textile material; and I do hereby declare that the following is a full and exact description thereof, reference being had to the accompanying drawings, and to the letters of reference marked thereon.

The nature of my invention consists in a trellis for propagating bees and raising honey, and of affording protection to colonies during winter by a covering of cloth, or other like material, without the necessity of housing, placing in cellars, wrapping with straw, and other methods usually adopted.

To enable others to make and use my invention, I will proceed to describe its operation and construction.

Figure No. 2 represents the trellis with honey-combs attached. $a$ is the base-board, $b\ c\ d$ the posts, four of which are set in the base-board $a$, six or eight inches, or any other convenient distance desired, from its outer edges, thus affording a space six inches or more between the walls of the box covering the whole and the trellis where the bees are at work in the summer, or under the covering of cloth during winter. There is a strong wire or slat extending on the top from post $b$ to $c$, and from $d$ to its fellow, and projecting over it two inches more or less, for placing additional movable slats thereon, if deemed necessary. The trellis being entirely detached from the sides of the box, the slats can be readily removed without disturbing or injuring the colony to any great extent. Moreover, the space being large, all the bees have a chance to work, which they do not in a close hive. This space also prevents the swarming of strong colonies—a desideratum among those who wish to keep only a few colonies.

E is an arched passage to conduct the bees into their winter-quarters, and should be removed in the spring when the covering of cloth is removed.

Figure No. 3 represents the trellis covered with cloth, or other textile material, for winter-arrangement. Cloths being bad conductors of heat, retain the animal heat much better than any other material, and, being in immediate contact with the colony, and then having a column of air between the covering and the box; bees may be exposed to ordinary temperatures, and come out better in spring than if placed in a cellar, or housed in any other manner. It forms a hive of cloth not accumulating frost, and preventing the dangers resulting from such accumulation. By this arrangement small colonies can be protected as well as large ones; even a single comb can be thus protected efficiently.

Figure 1 represents the box, with the upper section, $f$, raised to inspect the trellis. The lower section, $g$, is not attached to the base-board $a$, merely resting upon it, so that the upper section $f$ can be raised at pleasure, or the whole may be lifted from the base-board. By this arrangement, and the space of six inches more or less between the outer wall of the box and the trellis, many advantages are secured:

First, the easy and frequent examination of the bees.

Second, the opportunity to keep the whole clean from moths or any foreign substances.

Third, to inspect the condition of the queen cells.

Fourth, not disturbing the colony while making inspections.

Fifth, the facility of exposing the whole colony to a bright light in an instant.

Thus, instead of the ordinary bee-hive, I have a trellis, entirely detached six inches or more from the hive or box covering it. In the working-season, the slats, when full, can be easily removed, as there is no attachment to the hive, and, should the colony work outwards in the space, the combs can be cut away with a knife, and thus prepare the colony for its winter-protection.

At the proper season, remove the box from the base-board. Then take some kind of textile material, as carpet, cloths, or like fabrics, which have served their use in the household, and cover the trellis either by wrapping it about the trellis, or cutting it of the proper shape and sewing it, that it may be applied over the trellis like a hood. Thus the cloth is in immediate contact with the colony. Then, if thought best, fill up the space between the trellis and the walls of section *g* of the box with hay, straw, or other material of like character. Then put on the upper section *f*, fitting it as above, and the colony is ready for its safe and sure protection in the winter. When the following spring comes, remove section *f* of the box; take out all the filling up, if any has been used; then remove the cloth covering, take out the arched passage E, put on the section *f*, removed, and the bees are ready for work.

What I claim is—

The protecting of bees during winter by means of a cloth or other textile covering substantially in the manner and form as above described, rendering other protection, as housing, placing in cellars, wrapping hives with straw, &c., unnecessary.

ANDREW SIMONS.

Witnesses:
  J. M. SHAFFER,
  G. W. PHELPS.